United States Patent
Gheorghita et al.

(10) Patent No.: US 10,108,150 B1
(45) Date of Patent: Oct. 23, 2018

(54) WAKING USER UP IN TIME TO ARRIVE AT APPOINTMENT BY CALCULATING BED-TO-DOOR TIME

(71) Applicant: GOOGLE INC., Mountain View, CA (US)

(72) Inventors: Oana Gheorghita, Zurich (CN); Ali Ajdari Rad, Adliswil (CH); Ian James Leader, Zurich (CH); Fabian Roth, Zurich (CH); Hans Van Wesenbeeck, Winterthur (CH); Kristoffer Lidstroem, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 130 days.

(21) Appl. No.: 14/838,858

(22) Filed: Aug. 28, 2015

(51) Int. Cl.
*G04G 15/00* (2006.01)
*H04W 4/02* (2018.01)

(52) U.S. Cl.
CPC ............ *G04G 15/00* (2013.01); *H04W 4/02* (2013.01)

(58) Field of Classification Search
CPC ................................................. G04G 14/00
See application file for complete search history.

(56) References Cited

U.S. PATENT DOCUMENTS

| | | | |
|---|---|---|---|
| 8,195,203 B1 | 6/2012 | Tseng | |
| 2001/0048639 A1* | 12/2001 | Davidson | G04F 1/005 368/82 |
| 2014/0058679 A1* | 2/2014 | Varoglu | H04M 1/72569 702/19 |
| 2014/0129124 A1* | 5/2014 | Margulici | G08G 1/0112 701/117 |
| 2014/0171146 A1 | 6/2014 | Ma et al. | |
| 2014/0243021 A1 | 8/2014 | Lerenc | |
| 2016/0003637 A1* | 1/2016 | Andersen | G01C 21/3617 701/519 |
| 2016/0360382 A1* | 12/2016 | Gross | G06F 3/0488 |
| 2016/0363455 A1* | 12/2016 | Masutani | G08G 1/096827 |
| 2017/0031325 A1* | 2/2017 | Price | G04G 13/021 |

* cited by examiner

*Primary Examiner* — Edwin A. Leon
*Assistant Examiner* — Jason Collins
(74) *Attorney, Agent, or Firm* — Brake Hughes Bellermann LLP (57) ABSTRACT

A computing system may process previous inputs from a user into at least one electronic device, the previous inputs including at least a first input indicating that the user has woken up and a second input indicating that the user has left a sleeping location. The computing system may predict a bed-to-door time duration between the user waking up and the user leaving the sleeping location based on the first input indicating that the user has woken up and the second input indicating that the user has left the sleeping location. The computing system may determine a wakeup time for the user based on the predicted bed-to-door time duration and a time at which the user should leave the sleeping location to arrive at the appointment on time. The computing system may cause the at least one electronic device to output an alarm at the determined wakeup time.

15 Claims, 7 Drawing Sheets

WAKING USER UP IN TIME TO ARRIVE AT APPOINTMENT BY CALCULATING BED-TO-DOOR TIME

TECHNICAL FIELD

This description relates to determining appointment times.

BACKGROUND

Persons may need to arrive at appointments on time. It may be difficult for them to schedule their day in such a manner as to arrive at their appointments on time.

SUMMARY

According to an example implementation, a non-transitory computer-readable storage medium may include instructions stored thereon for waking a user up in time to timely arrive at an appointment. When executed by at least one processor, the instructions may be configured to cause a computing system to at least process previous inputs from the user into at least one electronic device, the previous inputs including at least a first input indicating that the user has woken up and a second input indicating that the user has left a sleeping location; predict a bed-to-door time duration between the user waking up and the user leaving the sleeping location based on the first input indicating that the user has woken up, and the second input indicating that the user has left the sleeping location; determine a wakeup time for the user based on the predicted bed-to-door time duration and a time at which the user should leave the sleeping location to arrive at the appointment on time; and cause the at least one electronic device to output an alarm at the determined wakeup time.

According to an example implementation, a non-transitory computer-readable storage medium may include instructions stored thereon for waking a user up in time to timely arrive at an appointment. When executed by at least one processor, the instructions may be configured to cause a smartphone to at least retrieve, from a stored calendar, a time of a first appointment for a day; determine a travel time from a present location of the smartphone to a location of the first appointment; determine, based on previous inputs to the smartphone, a bed-to-door time; determine a wakeup time for the user to arrive at the appointment on time by subtracting the travel time and the bed-to-door time from the time of the first appointment of the day; and output an alarm at the determined wakeup time.

According to an example implementation, a non-transitory computer-readable storage medium may include instructions stored thereon for determining a wakeup time for a user. When executed by at least one processor, the instructions may be configured to cause a computing system to at least process wakeup inputs received by at least one electronic device associated with the user, the wakeup inputs indicating when the user has woken up; process exit inputs received by the at least one electronic device associated with the user, the exit inputs indicating when the user has exited a sleeping location in which the user was sleeping; predict a future bed-to-door time based on the wakeup inputs and the exit inputs; and schedule an alarm for the at least one electronic device associated with the user to wake the user up based in part on the predicted future bed-to-door time.

According to an example implementation, a computing system and/or a non-transitory computer-readable storage medium may include means for processing previous inputs from the user into at least one electronic device, the previous inputs including at least a first input indicating that the user has woken up and a second input indicating that the user has left a sleeping location; means for predicting a bed-to-door time duration between the user waking up and the user leaving the sleeping location based on the first input indicating that the user has woken up, and the second input indicating that the user has left the sleeping location; means for determining a wakeup time for the user based on the predicted bed-to-door time duration and a time at which the user should leave the sleeping location to arrive at the appointment on time; and means for causing the at least one electronic device to output an alarm at the determined wakeup time.

According to an example implementation, a computing system and/or a non-transitory computer-readable storage medium may include means for retrieving, from a stored calendar, a time of a first appointment for a day; means for determining a travel time from a present location of the smartphone to a location of the first appointment; means for determining, based on previous inputs to the smartphone, a bed-to-door time; means for determining a wakeup time for the user to arrive at the appointment on time by subtracting the travel time and the bed-to-door time from the time of the first appointment of the day; and means for outputting an alarm at the determined wakeup time.

According to an example implementation, a computing system and/or a non-transitory computer-readable storage medium may include means for processing wakeup inputs received by at least one electronic device associated with the user, the wakeup inputs indicating when the user has woken up; means for processing exit inputs received by the at least one electronic device associated with the user, the exit inputs indicating when the user has exited a sleeping location in which the user was sleeping; means for predicting a future bed-to-door time based on the wakeup inputs and the exit inputs; and means for scheduling an alarm for the at least one electronic device associated with the user to wake the user up based in part on the predicted future bed-to-door time.

The details of one or more implementations are set forth in the accompanying drawings and the description below. Other features will be apparent from the description and drawings, and from the claims.

DETAILED DESCRIPTION

A computing system may determine a wakeup time for a user based on a predicted bed-to-door time for the user, a predicted travel time, which may be considered a commute time, for the user, and a first appointment time for the user. The computing system, which may be the user's smartphone or a remote server, may subtract the travel time and the bed-to-door time from the time of the first appointment to determine the wakeup time. The smartphone may set an alarm to wake the user up at the determined wakeup time so that the user will arrive at the appointment on time.

The computing system may determine a location and time of the first appointment by checking the user's calendar, or based on previously monitored activity by the user, such as when and where the phone stops moving at commuting speeds in the morning. The computing system may determine the travel time based on calculated commute times between the user's residence and the location of the first appointment, or based on previously monitored travel activity by the user. The computing system may determine the bed-to-door time based on previously monitored activity, such as a time between moving the phone as detected by tilt sensors in the morning or input to turn an alarm off or unlock the smartphone, and input such as location input indicating that the user has left the residence. The computing device may determine the bed-to-door time based on additional inputs from other devices. For example, a device worn by a user may include an accelerometer and may be used to determine when the user wakes up based on accelerometer data. The determined wake up time and/or the accelerometer data may be communicated to another computing device (e.g. the user's phone) via a wireless or wired communication link.

Figure 1:
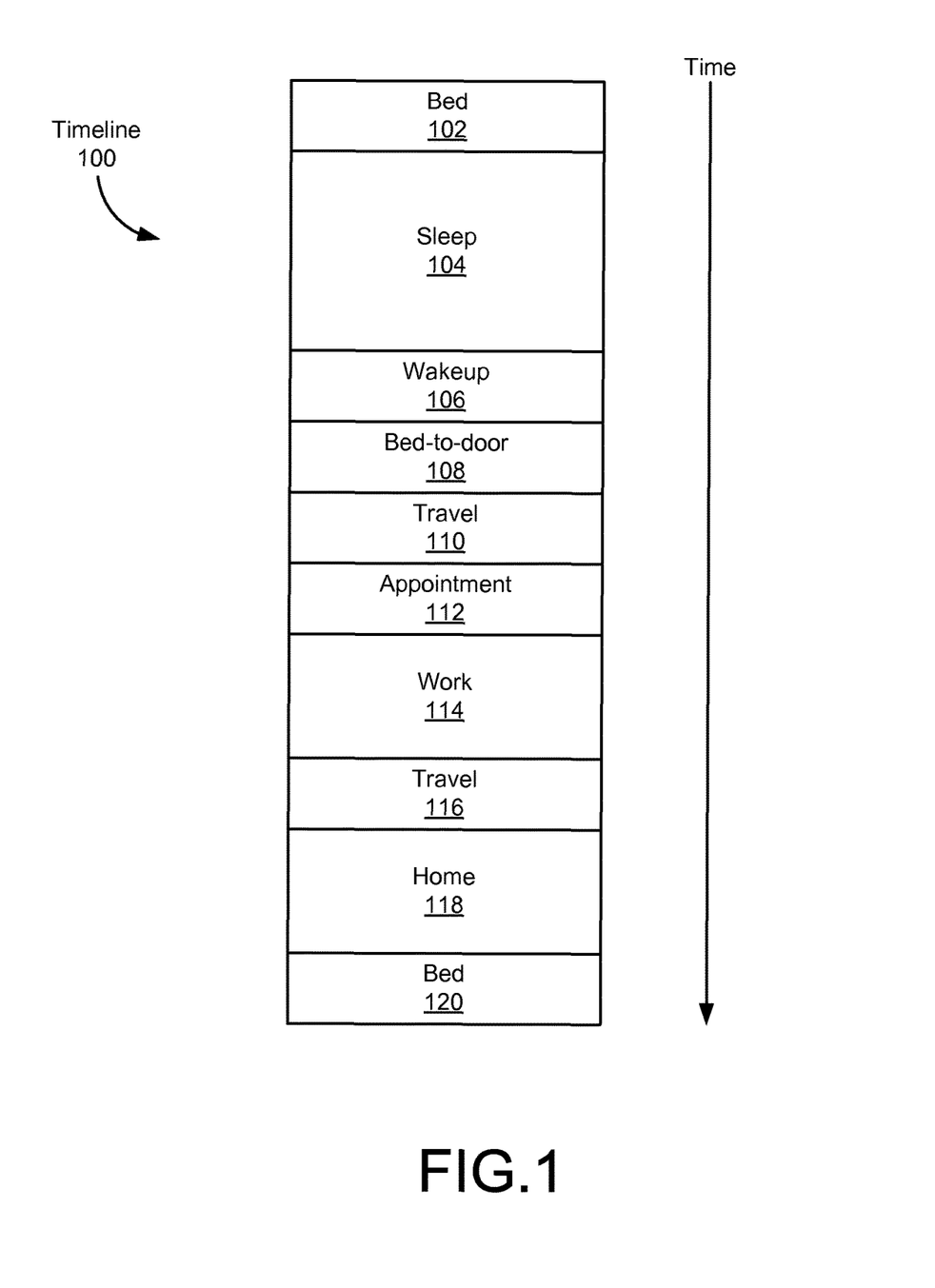
FIG. 1 is a block diagram showing a timeline of a user's day according to an example implementation.

FIG. 1 is a block diagram showing a timeline 100 of a user's day according to an example implementation. The user may have ended the previous day by getting into bed (102), and going to sleep (104). A computing system (described further with respect to FIG. 2), which may include at least one electronic device such as, for example, the user's smartphone, a wearable computing device, or other local device, or, in an example in which the user has opted in to allowing the user's activity to be monitored by a remote server, a remote server, may determine that the user is sleeping (104). In some implementations, the computing system may determine that the user is sleeping (104) based on a time of day and lack of input to the smartphone for an extended period of time, such as at least an hour. In some implementations, the computing system may determine that the user is sleeping (104) based on data from a device worn by the user (e.g., an accelerometer that indicates that the user is at rest for an extended period of time). In some implementations, the computing system may determine that the user is sleeping (104) based on data from one or more device in the home of the user. For example, the user's home may include motion sensors, light sensors, etc. and sensor data from the user's bedroom may indicate that the user entered the bedroom, turned off the lights in the bedroom, lay down in the bed, and then became at rest in the bed.

The user's sleep (104) period may end when the user wakes up (106). The user may wake up (106) in response to an alarm set on and/or outputted by the at least one electronic device such as a smartphone, a wearable device, an audio player (e.g., a radio), a video player (e.g., a television) a standalone alarm clock, or another device at a scheduled wakeup time, or due to other causes, such as external noise, sunshine, or not needing any more sleep. The computing system may determine a time at which the user has woken up (106) based on input to the computing system. The input to the computing system based on which the computing system determines the time at which the user has woken up (106) may include a tilt sensor in the smartphone detecting movement such as the user picking up and/or moving the smartphone, the user turning an alarm on the smartphone off, the user ending a snooze feature on the smartphone (if the user activates a snooze feature on the smartphone then the user may be considered to still be in bed and the bed-to-door time may not yet commence), the user unlocking the smartphone, a wearable electronic device such as a fitness or sleep monitor receiving input indicating the user has woken up, input or lack of input to Internet of Things (JOT) devices in proximity to the user indicating that the user has woken up, input or lack of input to any devices in the user's residence which receive input indicating that the user has woken up, or any other input to the smartphone or other device that the computing system may interpret as indicating that the user has woken up (106).

The user may engage in "bed-to-door" activities during a bed-to-door time duration (108). The bed-to-door activities may include getting out of bed, showering, getting dressed, eating breakfast, and any other activities that the user engages in before leaving the residence in which the user was sleeping. The bed-to-door time duration (108) may be calculated as the time between the user waking up (106) and leaving the residence and/or traveling (110).

The user may travel (110) to work. The computing system may determine a time at which the user has commenced traveling (110) based on location input to the at least one electronic device such as a smartphone or other device indicating that the user has left the residence in which the user was sleeping. The location input may include Global Positioning System (GPS) input, signal strength of Institute for Electrical and Electronics Engineers (IEEE) 802.11 ("Wireless Fidelity" or "WiFi") access points in or near the residence, and/or signal strengths of cellular base stations. The computing system may calculate the bed-to-door time duration (108) by subtracting the wakeup time (106) from the time at which the user commenced traveling (110).

The user may travel (110) from the user's residence to the user's first appointment (112) of the day. The computing system may determine that the user has arrived at the appointment (112) based on location input to the smartphone matching a location of the appointment (112). The computing system may determine the location of the appointment based on a location included in a calendar entry, or based on previously monitored locations of the user's smartphone. The computing system may determine the travel duration by subtracting the time at which the user commenced travel (110) from the time at which the user arrived at the appointment (112).

After and/or upon arriving at the appointment (112), the user may begin working (114). After finishing work (114), the user may travel (116) back to the user's home (118) and/or place of residence. While at home (118), the user may engage in activities such as eating dinner, socializing, web browsing, or watching television. At home, the user may also go back to bed (120), and begin anew the cycle that started at being in bed (102) as described above.

Figure 2:
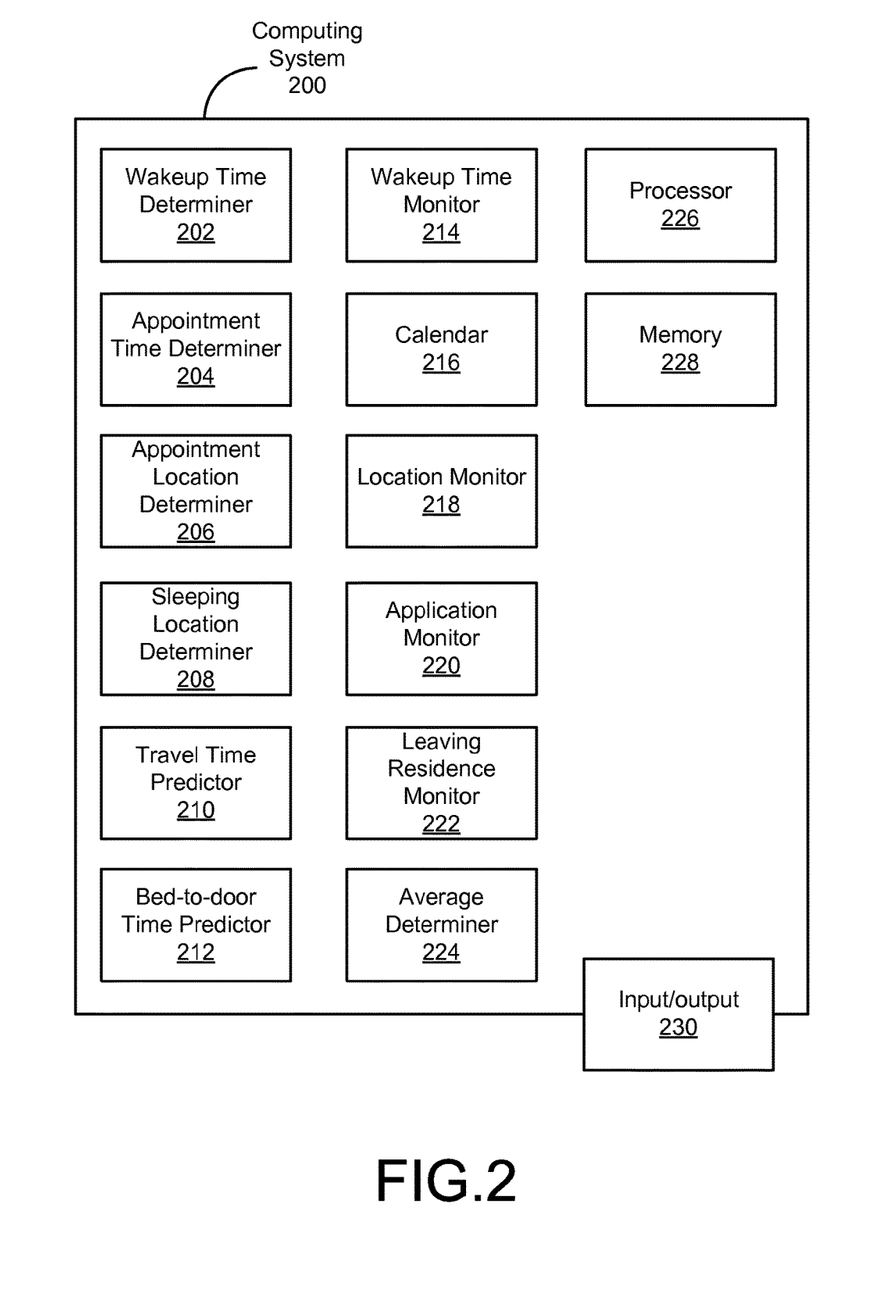
FIG. 2 is a block diagram of a computing system according to an example implementation.

FIG. 2 is a block diagram of a computing system 200 according to an example implementation. The functions, processes, and/or methods described with respect to the computing system 200 may all be performed by the user's at least one electronic device such as a smartphone or other device, or multiple devices that work together to perform the functions, processes, or methods described herein, or, in an example in which the user opts in to sharing data with a service provider, some of the functions, processes, and/or methods may be performed by one or more remote servers that are in communication with the user's smartphone. In the opt-in example, the smartphone may send data to the server, such as location data, calendar data, and/or data indicating that the user has interacted with the smartphone, and the server may send the determined wakeup time to the smartphone and/or may schedule the alarm for the smartphone at the determined wakeup time.

The computing system 200 may include a wakeup time determiner 202. The wakeup time determiner 202 may determine a wakeup time for the user so that the user can arrive at the user's first appointment of the day on time. The wakeup time determiner 202 and/or computing system 200 may set an alarm on the user's smartphone based on the determined wakeup time. The wakeup time determiner 202 may determine the wakeup time by subtracting a determined travel time duration and/or commute time and a determined bed-to-door time duration from the time of the user's first appointment of the day.

The computing system 200 may include an appointment time determiner 204. The appointment time determiner 204 may determine the time of the user's first appointment. The appointment time determiner 204 may determine the time of the user's first appointment by checking a calendar 216 associated with the user, or based on previously monitored patterns of the user, such as a time when the user stops moving the user's smartphone at automobile or bicycle speed after leaving the user's residence.

The computing system 200 may include an appointment location determiner 206. The appointment location determiner 206 may determine the location of the user's first appointment. The appointment location determiner 206 may determine the location of the user's first appointment by checking the calendar 216 associated with the user, or based on previously monitored patterns of the user, such as a location where the user stops moving the user's smartphone at automobile or bicycle speed after leaving the user's residence.

The computing system 200 may include a sleeping location determiner 208. The sleeping location determiner 208 may determine a location at which the user resides such as a residence associated with the user, and/or at which the user is sleeping (104). The sleeping location determiner 208 may determine the location at which the user resides and/or is sleeping based on a home address inputted by the user into the smartphone, and/or based on a monitored location of the user's smartphone, such as a monitored location of the user's smartphone when the user is sleeping (104). The sleeping location determiner 208 may determine different sleeping locations for the user, and the computing system may determine different bed-to-door times for each location and different travel times for each location, based on which the computing system 200 may determine different wakeup times based on where the user is sleeping for a given night.

The computing system 200 may include a travel time predictor 210. The travel time predictor 210 may predict a travel time duration (110) and/or commute time duration for the user to travel from the user's residence to the appointment (112). In an example implementation, the travel time predictor 210 may predict the travel time duration (110) based on a priori calculations of the time to travel between the user's residence and the appointment such as by calling a directions application programming interface (API) with parameters that include the user's residence as an origin, the appointment location as a destination, and the appointment time as an arrival time. The travel time predictor 210 may also predict the travel time duration (110) by taking into account current or predicted traffic and/or weather. In another example implementation, the travel time predictor 210 may predict the travel time duration (110) based on previously monitored travel times, which may include the time durations of monitored locations between when the user left the user's residence and when the user arrived at work and/or appointments that have close locations to the user's first location of the day or time based on monitored travels by other users along the routes the user would take from his sleeping location to his appointment location during times having traffic patterns similar to the predicted traffic pattern of during the user's trip from his sleeping location to his appointment location. The travel time predictor 210 may also predict the travel time duration (110) based on either calculations or previously monitored travel time in conjunction with other retrieved data such as weather data. For example, on sunny days the travel time predictor 210 may predict the travel time duration (110) based on an assumption that the user will walk or ride a bicycle to the appointment, whereas on rainy or cold days the travel time predictor 210 may predict the travel time duration (110) based on an assumption that the user will drive or take public transportation to the appointment. In an example embodiment, the computing system 200 may also include a user interface via which the user may set and/or confirm the user's mode of travel for the next day and/or preferences based on weather, such as by walking, bicycle, private automobile, or public transportation.

The travel time predictor 210 may predict the travel time duration (110) as a median of the previously monitored travel time durations, as a mean of the previously monitored travel time durations, or, if the user is risk-averse to being late for appointments, the travel time predictor 210 may predict a longer travel time duration based on the variance of the previously monitored travel time durations, such as one or two standard deviations longer than the mean.

The computing system 200 may include a bed-to-door time predictor 212. The computing system 200 may predict a bed-to-door time duration (108) for the user, which is the time duration between when the user wakes up (106) and when the user commences travel (110) by leaving the user's residence, based on previously monitored bed-to-door times by the user. In example implementations, the computing system 200 may determine that the user has commenced travel (110) and/or left the user's residence based on location data, and/or based on monitoring application usage by the user, such as when the user launches an application that provides turn-by-turn directions to work. The bed-to-door time predictor 212 may predict the bed-to-door time duration (108) as a median of the previously monitored bed-to-door time durations, as a mean of the previously monitored bed-to-door time durations, or, if the user is risk-averse to being late for appointments, the bed-to-door time predictor 212 may predict a longer bed-to-door time duration based on the variance of the previously monitored bed-to-door time durations, such as one or two standard deviation longer than the mean.

The computing system 200 may include a wakeup time monitor 214. The wakeup time monitor 214 may determine the time at which the user wakes up by monitoring inputs to the user's smartphone, such as a tilt sensor receiving input indicating that the user has tilted, picked up, and/or moved the user's smartphone, inputs such as keyboard or touchscreen inputs turning off an alarm of the user's smartphone, inputs such as keyboard or touch screen inputs unlocking the smartphone, and/or location inputs or data indicating that the user has moved the user's smartphone from a location in which the user was sleeping (104).

The computing system 200 may include and/or maintain a calendar 216 associated with the user. The calendar 216 may include appointments, such as the user's first appointment of the day. The appointments may include descriptions of the appointments, times of the appointments, and/or locations of the appointments. In examples in which the appointments do not include locations, the appointment location determiner 206 may determine a location of the appointment based on the description and/or based on previously monitored locations of the user's smartphone during similar appointments.

The computing system 200 may include a location monitor 218. The location monitor 218 may monitor the location of the user's smartphone, from which the user's location may be inferred. The location monitor 218 may monitor and/or determine the location of the user's smartphone based on GPS input, access point signal strengths, and/or base station signal strengths. The location monitor 218 may provide location information to the appointment location determiner 206, sleeping location determiner 208, travel time predictor 210, bed-to-door time predictor 212, and/or a leaving residence monitor 222.

The computing system 200 may include an application monitor 220. The application monitor 220 may monitor and/or determine when the user launches or initiates, uses or interacts with, and/or closes or terminates specific applications. The application monitor 220 may provide information regarding the user's launching, initiating, use of, interaction with, closing, and/or terminating applications to the travel time predictor 210, bed-to-door time predictor 212, and/or the leaving residence monitor 222.

The computing system 200 may include the leaving residence monitor 222. The leaving residence monitor 222 may monitor and/or determine when the user leaves the user's residence and/or place where the user was sleeping, which may coincide with when the user commences travel. In example implementations, the leaving residence monitor 222 may determine that the user has commenced travel (110) and/or left the user's residence based on location data received from the location monitor 218, based on the application monitor 220 monitoring application usage by the user, such as when the user launches an application that provides turn-by-turn directions to work, and/or based on one or more devices in the user's sleeping location and/or residence detecting that the user has left, such as by a motion sensor or via sensor lock on one or more doors.

The computing system 200 may include an average determiner 224. The average determiner 224 may determine the average time duration between when the user wakes up (106) and when the user arrives at the user's appointment (112). The average determiner 224 may determine the average time duration between when the user wakes up (106) and when the user arrives at the user's appointment (112) as a sum of the medians of the bed-to-door time duration (108) and the travel time duration (110), as a sum of the means of the bed-to-door time duration (108) and the travel time duration (110), or if the user is risk-averse to being late for appointments, the average determiner 224 may predict a total time duration based on the variance of the previously monitored total time durations, such as the sum of one standard deviation longer than the means of the bed-to-door time (108) and the travel time (110) or one standard deviation longer than the sum of the means of the bed-to-door time (108) and the travel time (110) if the user is willing to tolerate a sixteen percent (16%) chance of being late for the appointment (112), or two standard deviations longer than the either the sum of the means or the mean of the sum of the bed-to-door time duration (108) and the travel time duration (110) if the user is willing to tolerate a two percent (2%) chance of being late for the appointment (112).

The computing system 200 may include at least one processor 226. The at least one processor 226 may include one or more processors capable of executing instructions, such as instructions to perform any of the methods, functions, and/or processes described herein.

The computing system 200 may include at least one memory device 228. The at least one memory device 228 may store instructions and data. The instructions stored by the at least one memory device 228 may include instructions that, when executed by the at least one processor 226, are configured to cause the computing system 200 to perform any combination of the methods, functions, and/or processes described herein. The data stored by the at least one memory device 228 may include data used by the computing system 200 to perform, and/or generated by the computing system 200 when performing, any of the methods, functions, and/or processes described herein.

The computing system 200 may include input/output modules 230. The input/output modules 230 may receive input from the user and/or other computing devices, and may provide output to the user and/or other computing devices. The input/output modules 230 may include input devices such as a keyboard, a touchscreen, data input nodes such as a Universal Serial Bus (USB) port and/or wireless interface, location sensors such as GPS monitors, a tilt sensor, and/or a microphone, and may include output devices such as a display, speaker (which may output an alarm sound), vibration device, and/or data input nodes such as the USB port and/or wireless interface.

By setting an alarm based on the user's first appointment, the user's predicted bed-to-door time, and the user's predicted travel time, the computing system 200 may set the alarm without explicit intervention by the user. By setting the alarm without explicit intervention by the user, the computing system 200 may reduce power consumption by obviating the need to process input from the user and/or by obviating the need to display a user interface for an alarm clock application to the user. The computing system 200 may also ease the user's scheduling by setting a wakeup time (106) for the user, without user intervention. The computing system 200 may also pre-compute the wakeup time (106) while the user is sleeping (104), and/or may change the wakeup time (106) while the user is sleeping (104), such as based on changing traffic patterns including a reported accident along the route via which the user is likely to travel. By precomputing the wakeup time (106) while the user is sleeping (104), the computing system 200 may determine the wakeup time (106) while fewer processes are being performed than after the user wakes up (106), and may utilize what would otherwise be idle computing resources rather than compete for scarce computing resources during busier times of the day.

Figure 3:
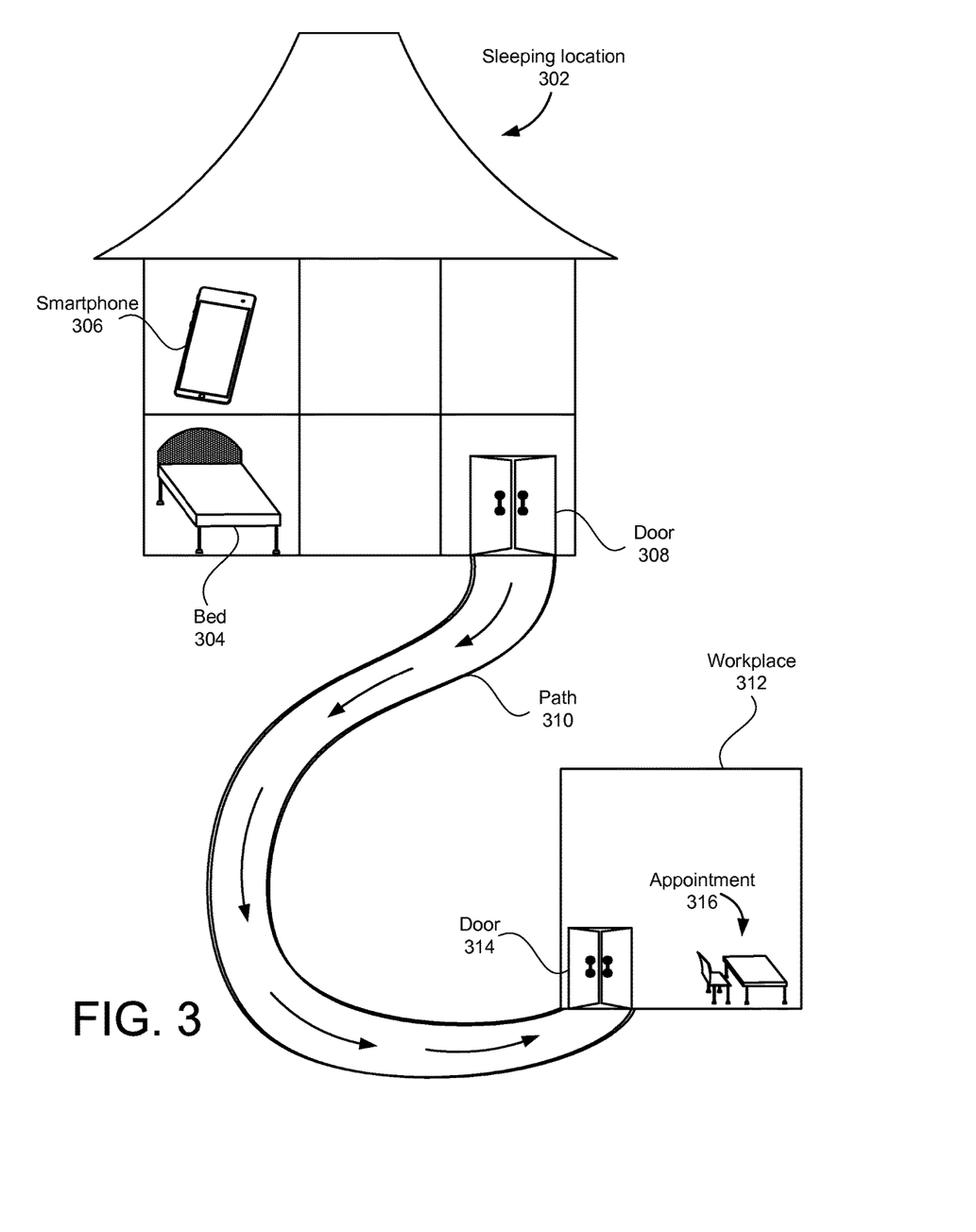
FIG. 3 is a schematic diagram showing locations of a user during a workday according to an example implementation.

FIG. 3 is a schematic diagram showing locations of a user during a workday according to an example implementation. The user may sleep (104) in a bed 304 of a sleeping location 302. The user may keep the user's smartphone 306 near the bed 304 where the user is sleeping. The user may keep the user's smartphone 306 near the bed 304 so that the smartphone 306 may monitor whether the user is sleeping, and/or so that the smartphone 306 can wake the user up (106) by outputting an alarm.

The smartphone 306 may output an alarm at the wakeup time (106). The alarm may be audible, such as noise that wakes the user up, physical movement such as vibration to wake the user up, or light-based, such as emitting enough light to wake the user up, or any combination thereof. The user may wake up (106) in response to the alarm outputted by the smartphone. After waking up, the user may engage in bed-to-door (108) activities, such as showering, getting dressed, and eating breakfast.

After the bed-to-door (108) activities, the user may exit the sleeping location 302 through an exit such as a door 308, and begin traveling (110) to the appointment. The user may travel (110) to the user's workplace along the path 310, which may be a road, rail line, sidewalk, or trail, via automobile, train, walking, or cycling. At the end of the traveling (11), the user may arrive at the user's workplace 312. The user may arrive at the place of the appointment 316 by entering a door 314 of the workplace 312.

Figure 4:
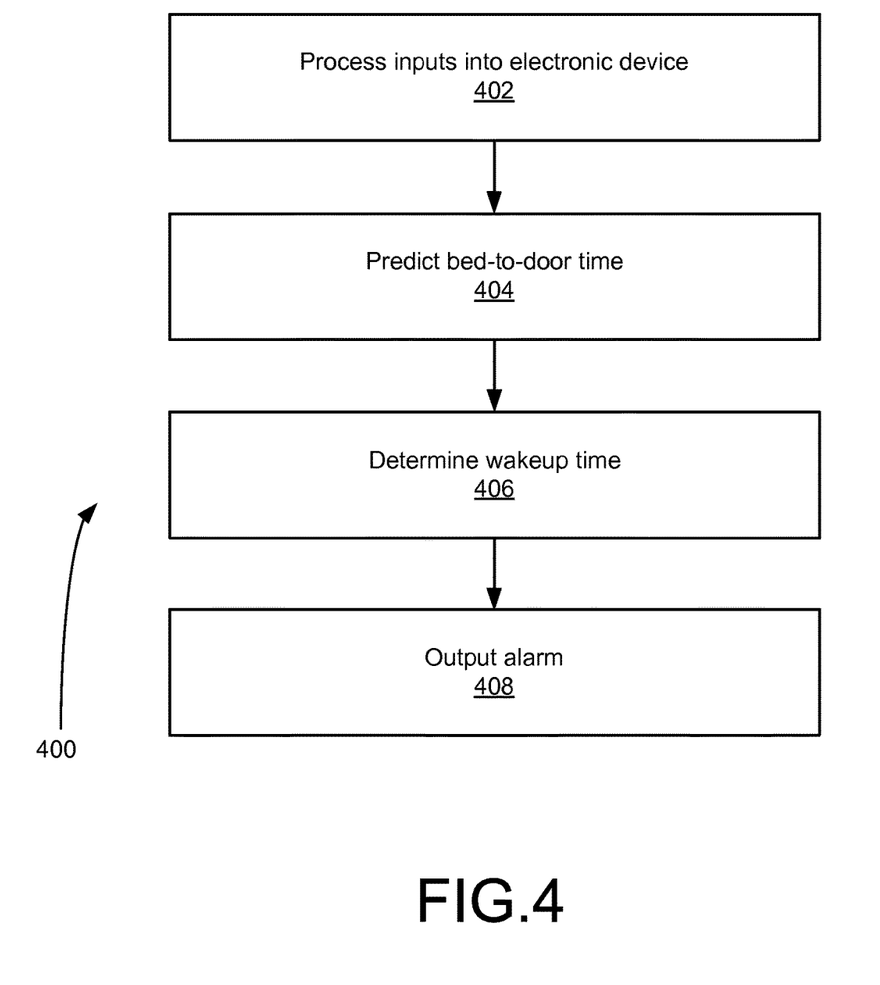
FIG. 4 is a flowchart of a method for waking a user up in time to timely arrive at an appointment according to an example implementation.

FIG. 4 is a flowchart of a method 400 for waking a user up in time to timely arrive at an appointment according to an example implementation. The method 600 may be performed by a computing system, such as the computing system 200. According to this example, the method 400 may include processing inputs into at least one electronic device (402), which may include a smartphone, such as by processing previous inputs from the user into at least one electronic device, the previous inputs including at least a first input indicating that the user has woken up and a second input indicating that the user has left a sleeping location. The method 400 may also include predicting a bed-to-door time (404), such as by predicting a bed-to-door time duration between the user waking up and the user leaving the sleeping location based on the first input indicating that the user has woken up, and the second input indicating that the user has left the sleeping location. The method 400 may also include determining a wakeup time (406), such as by determining a wakeup time for the user based on the predicted bed-to-door time duration and a time at which the user should leave the sleeping location to arrive at the appointment on time. The method 400 may also include outputting an alarm (408), such as the at least one electronic device to outputting an alarm at the determined wakeup time.

According to an example implementation, the first input indicating that the user has woken up may include tilt sensor input indicating that the user has picked the at least one electronic device up.

According to an example implementation, the first input indicating that the user has woken up may include input to turn off an alarm on the at least one electronic device.

According to an example implementation, the first input indicating that the user has woken up may include input to unlock the at least one electronic device.

According to an example implementation, the second input indicating that the user has left the sleeping location may include location input indicating that the user is not located in the sleeping location.

According to an example implementation, the second input indicating that the user has left the sleeping location may include Global Positioning System (GPS) input indicating that the user is not located in the sleeping location.

According to an example implementation, the predicting the bed-to-door time duration (404) may include determining a median time duration between the first input indicating that the user has woken up and the second input indicating that the user has left the sleeping location.

According to an example implementation, the determining the predicted bed-to-door time duration (404) may include determining a mean time duration, plus a configurable number of standard deviations, between the first input indicating that the user has woken up and the second input indicating that the user has left the sleeping location, the configurable number of standard deviations being based on a tolerable risk of being late.

According to an example implementation, the method 400 may further include setting the alarm for the at least one electronic device based on the determined wakeup time.

According to an example implementation, the determining the wakeup time (406) may include determining the time at which the user should leave the sleeping location based on a time of the appointment, a location of the appointment, and a commute time between the sleeping location and the location of the appointment.

According to an example implementation, the method 400 may further include determining a location of the sleeping location based on previously determined locations of the at least one electronic device associated with the user during sleeping hours.

According to an example implementation, the method 400 may further include determining the location of the appointment based on previously determined locations of the at least one electronic device associated with the user during working hours.

According to an example implementation, the method 400 may further include determining the commute time based on previously determined locations of the at least one electronic device associated with the user during travel between the sleeping location and a workplace associated with the user.

According to an example implementation, the method 400 may further include determining the commute time based on determining a public transit time between the sleeping location and a workplace associated with the user.

According to an example implementation, the method 400 may further include determining that the user travels to the workplace via public transit by comparing previous locations of the at least one electronic device to public transit lines.

According to an example implementation, the method 400 may further include determining that the user travels to the workplace via public transit by comparing previous locations of the at least one electronic device to previous locations of other users' smartphones.

According to an example implementation, the user may have opted in to sharing locations of the at least one electronic device with an application that determines the wakeup time, and the computing system may include a remote server in communication with the at least one electronic device.

Figure 5:
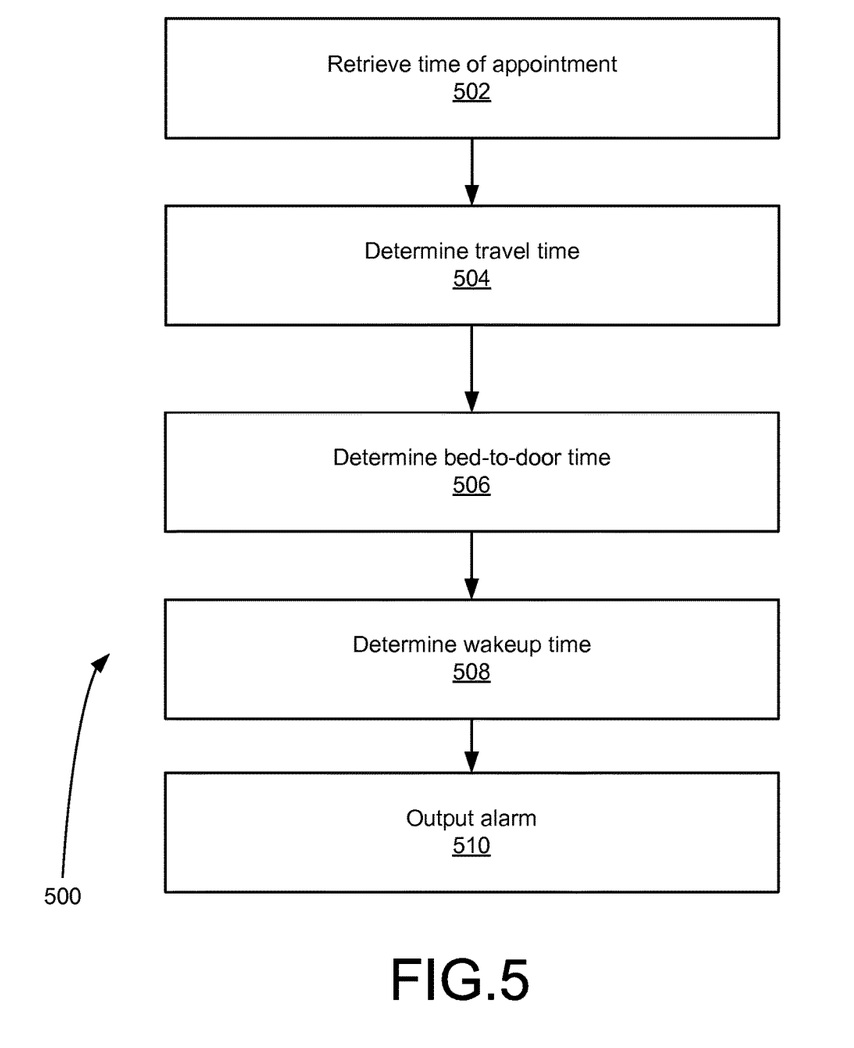
FIG. 5 is a flowchart of a method for waking a user up in time to timely arrive at an appointment according to another example implementation.

FIG. 5 is a flowchart of a method 500 for waking a user up in time to timely arrive at an appointment according to another example implementation. The method 500 may be performed by a smartphone. According to this example, the method 500 may include the smartphone retrieving a time of first appointment (502) such as by retrieving, from a stored calendar, a time of a first appointment for a day. The method 500 may also include determining a travel time (504), such as by determining a travel time from a present location of the smartphone to a location of the first appointment. The method 500 may also include determining a bed-to-door time (506), such as by determining, based on previous inputs to the smartphone, a bed-to-door time. The method 500 may also include determining a wakeup time (508), such as by determining a wakeup time for the user to arrive at the appointment on time by subtracting the travel time and the bed-to-door time from the time of the first appointment of the day. The method 500 may also include outputting an alarm (510), such as by outputting an alarm at the determined wakeup time.

Figure 6:
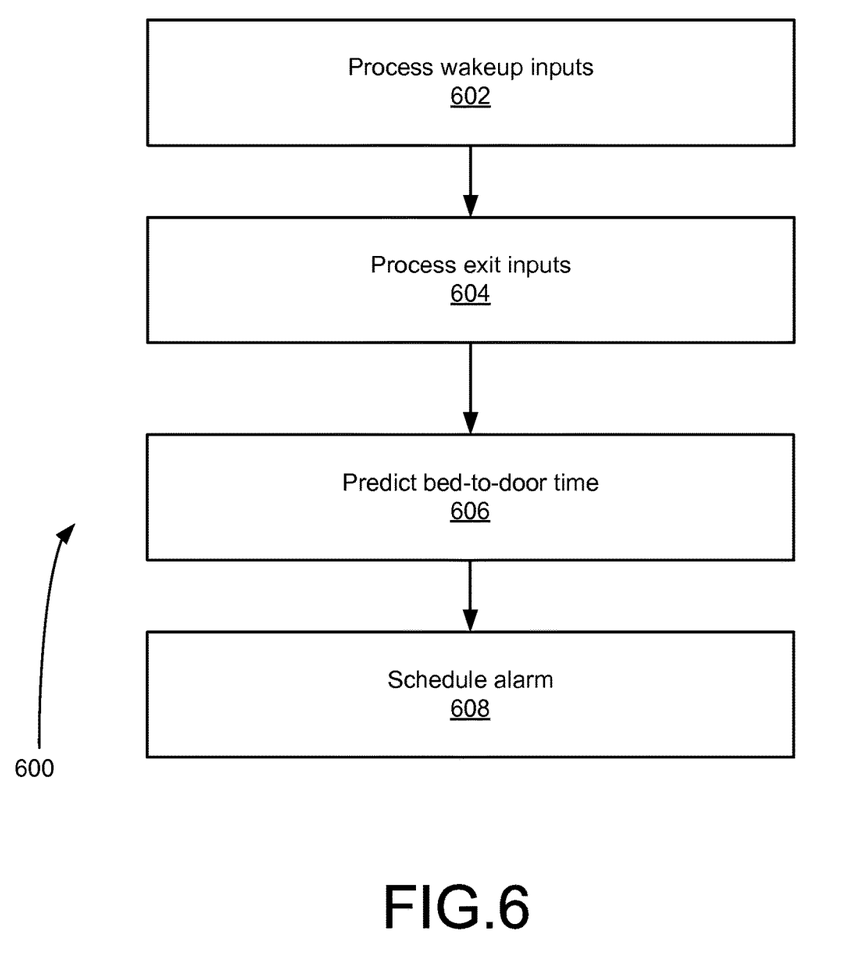
FIG. 6 is a flowchart of a method according to another example implementation.

FIG. 6 is a flowchart of a method 600 for determining a wakeup time for a user according to another example implementation. The method 600 may be performed by a computing system, such as the computing system 200. The method 600 may include processing wakeup inputs (602), such as by processing wakeup inputs received by at least one electronic device associated with the user, the wakeup inputs indicating when the user has woken up. The method 600 may include processing exit inputs (604), such as by processing exit inputs received by the at least one electronic device associated with the user, the exit inputs indicating when the user has exited a sleeping location in which the user was sleeping. The method 600 may include predicting a bed-to-door time (606), such as by predicting a future bed-to-door time based on the wakeup inputs and the exit inputs. The method 600 may include scheduling an alarm (608), such as by scheduling an alarm for the at least one electronic device associated with the user to wake the user up based in part on the predicted future bed-to-door time.

According to an example implementation, the method 600 may further include causing the at least one electronic device to output the scheduled alarm.

Figure 7:
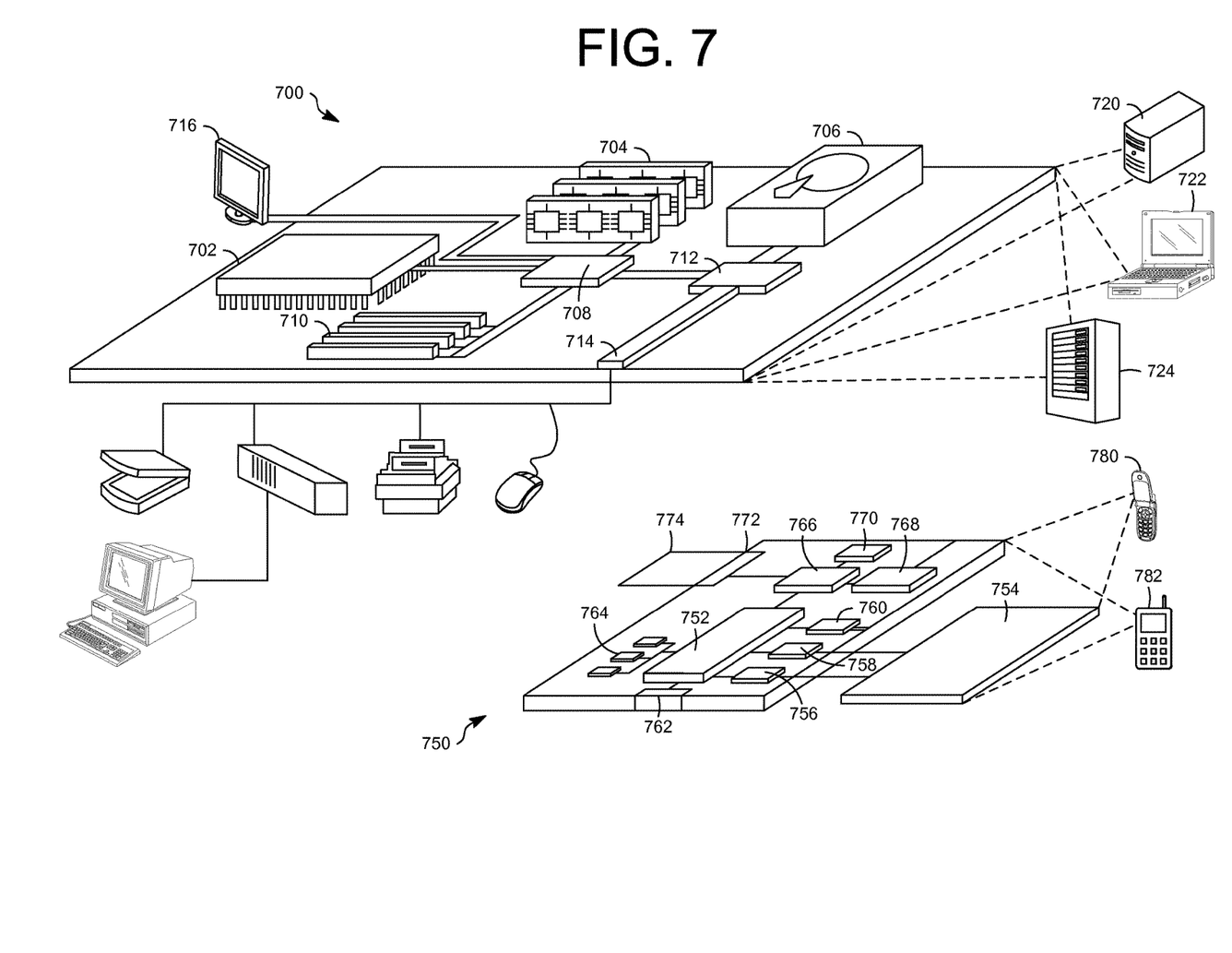
FIG. 7 shows an example of a generic computer device and a generic mobile computer device, which may be used with the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon for waking a user up in time to timely arrive at an appointment, that, when executed by at least one processor, are configured to cause a computing system to at least:
receive multiple wakeup inputs indicating that the user has woken up and multiple travel inputs indicating that the user has left a sleeping location;
predict a bed-to-door time duration between the user waking up and the user leaving the sleeping location based on an average time duration between the multiple wakeup inputs indicating that the user has woken up and the multiple travel inputs indicating that the user has left the sleeping location;
determine a wakeup time for the user based on the predicted bed-to-door time duration and a time at which the user should leave the sleeping location to arrive at the appointment on time; and
cause the computing system to output an alarm at the determined wakeup time,
wherein the average time duration includes a median time duration between the multiple wakeup inputs indicating that the user has woken up and the multiple travel inputs indicating that the user has left the sleeping location.

2. The non-transitory computer-readable storage medium of claim 1, wherein the wakeup inputs indicating that the user has woken up include tilt sensor inputs indicating that the user has picked the computing system up.

3. The non-transitory computer-readable storage medium of claim 1, wherein the wakeup inputs indicating that the user has woken up include inputs to turn off an alarm on the computing system.

4. The non-transitory computer-readable storage medium of claim 1, wherein the wakeup inputs indicating that the user has woken up include inputs to unlock the computing system.

5. The non-transitory computer-readable storage medium of claim 1, wherein the travel inputs indicating that the user has left the sleeping location include location inputs indicating that the user is not located in the sleeping location.

6. The non-transitory computer-readable storage medium of claim 1, wherein the travel inputs indicating that the user has left the sleeping location include Global Positioning System (GPS) inputs indicating that the user is not located in the sleeping location.

7. The non-transitory computer-readable storage medium of claim 1, wherein the instructions are further configured to cause the computing system to set the alarm for the computing system based on the determined wakeup time.

8. The non-transitory computer-readable storage medium of claim 1, wherein the determining the wakeup time includes determining the time at which the user should leave the sleeping location based on a time of the appointment, a location of the appointment, and a commute time between the sleeping location and the location of the appointment.

9. The non-transitory computer-readable storage medium of claim 8, wherein the instructions are further configured to cause the computing system to determine a location of the sleeping location based on previously determined locations of the computing system associated with the user during sleeping hours.

10. The non-transitory computer-readable storage medium of claim 8, wherein the instructions are further configured to cause the computing system to determine the location of the appointment based on previously determined locations of the computing system associated with the user during working hours.

11. The non-transitory computer-readable storage medium of claim 8, wherein the instructions are further configured to cause the computing system to determine the commute time based on previously determined locations of the computing system associated with the user during travel between the sleeping location and a workplace associated with the user.

12. The non-transitory computer-readable storage medium of claim 8, wherein the instructions are further configured to cause the computing system to determine the commute time based on determining a public transit time between the sleeping location and a workplace associated with the user.

13. The non-transitory computer-readable storage medium of claim 12, wherein the instructions are further configured to cause the computing system to determine that the user travels to the workplace via public transit by comparing previous locations of the computing system to public transit lines.

14. The non-transitory computer-readable storage medium of claim 1, wherein:
the user has opted in to sharing locations of the computing system with an application that determines the wakeup time; and
the computing system includes a remote server in communication with the computing system.

15. A non-transitory computer-readable storage medium comprising instructions stored thereon for waking a user up in time to timely arrive at an appointment, that, when executed by at least one processor, are configured to cause a computing system to at least:
receive multiple wakeup inputs indicating that the user has woken up and multiple travel inputs indicating that the user has left a sleeping location;
predict a bed-to-door time duration between the user waking up and the user leaving the sleeping location based on an average bed-to-door time duration between the multiple wakeup inputs indicating that the user has woken up and the multiple travel inputs indicating that the user has left the sleeping location, wherein the average bed-to-door time duration includes a mean time duration, plus a configurable number of standard deviations, between the multiple wakeup inputs indicating that the user has woken up and the multiple travel inputs indicating that the user has left the sleeping location, the configurable number of standard deviations being based on a tolerable risk of being late;
determine a wakeup time for the user based on the predicted bed-to-door time duration and a time at which the user should leave the sleeping location to arrive at the appointment on time; and
cause the computing system to output an alarm at the determined wakeup time.

* * * * *

UNITED STATES PATENT AND TRADEMARK OFFICE
CERTIFICATE OF CORRECTION

PATENT NO. : 10,108,150 B1
APPLICATION NO. : 14/838858
DATED : October 23, 2018
INVENTOR(S) : Gheorghita et al.

Page 1 of 1

It is certified that error appears in the above-identified patent and that said Letters Patent is hereby corrected as shown below:

On the Title Page

Column 1, Item (72), in "Inventors", Line 1, delete "(CN);" and insert -- (CH); --, therefor.

Signed and Sealed this
Nineteenth Day of March, 2019

Andrei Iancu
*Director of the United States Patent and Trademark Office*